L. A. SUBERS AND E. MOSMAN.
MACHINE FOR CONSTRUCTING A LAMINATED COHESIVE INTERLAID FABRIC.
APPLICATION FILED DEC. 13, 1920.

1,425,147.

Patented Aug. 8, 1922.
7 SHEETS—SHEET 1.

INVENTORS
Lawrence A. Subers
and
Ernest Mosman
BY
Fay, Oberlin & Fay.
ATTORNEYS

UNITED STATES PATENT OFFICE

LAWRENCE A. SUBERS, OF LAKEWOOD, AND ERNEST MOSMAN, OF CLEVELAND, OHIO; SAID MOSMAN ASSIGNOR TO SAID SUBERS.

MACHINE FOR CONSTRUCTING A LAMINATED COHESIVE INTERLAID FABRIC.

1,425,147.  Specification of Letters Patent.  Patented Aug. 8, 1922.

Application filed December 13, 1920. Serial No. 430,445.

*To all whom it may concern:*

Be it known that we, LAWRENCE A. SUBERS and ERNEST MOSMAN, citizens of the United States, and residents of Lakewood, county of Cuyahoga, and State of Ohio, and Cleveland, county of Cuyahoga, and State of Ohio, respectively, have invented a new and useful Improvement in Machines for Constructing a Laminated Cohesive Interlaid Fabric, of which the following is a specification, the principle of the invention being herein explained and the best mode in which we have contemplated applying that principle, so as to distinguish it from other inventions.

The objects of the invention are to provide an automatically operating machine for interlaying and laminating fibrous bands of cords or woven or braided material treated and coated with liquid rubber or other adhesive substance upon a flat intermittently moving table or conveyor to form a laminated cohesive interlaid fabric.

This machine is designed to produce a flat sheet of fabric of single thickness having raw edges, and of any predetermined length, the width being limited only by the desired width of machine. This fabric is planned to be used for constructing pneumatic tire casings, for conveyors, belting or any other suitable purpose desired. The fabric is constructed of a series of equally spaced parallel lying bands treated with suitable adhesive, laid at a predetermined angle upon the table, of a second series of equally spaced parallel lying bands laid over and upon the first series at a predetermined angle thereto, of a third series of equally spaced parallel lying bands laid over and exactly covering the spaces between the bands of the first series, and a fourth series of equally spaced parallel lying bands laid over and exactly covering the spaces between the bands of the second series, the whole being compressed to form a unitary adhering structure.

The principle of construction of this fabric is similar to that employed in constructing a laminated cohesive, interwound fabric as exemplified in my Patents No. 1,136,291, patented April 20th, 1915, and No. 1,011,190, patented December 5th, 1911, except the interlaying upon a flat surface as compared to the interwinding about a cylindrical mandrel. The latter fabric when slit lengthwise and flattened out has a practically identical appearance, although in reality the first series of bands wound around the mandrel would actually be somewhat shorter than the last series wound at a slightly increased diameter, while there would always be a tendency for the fabric when unrestrained to resume its cylindrical formation.

This laminated cohesive interlaid fabric would naturally be better adapted for belts or conveyors or construction into other built up fabrics than the laminated cohesive interwound fabric which would naturally adapt itself to tubular construction for use as hose, conduits, etc.

The invention comprises a series of band laying devices, arranged to each lay a series of parallel bands at a predetermined angle upon an intermittently moving table or conveyor, the succeeding series of bands being also laid at a predetermined angle to the preceding series.

It also includes means for storing said bands upon suitable mounted rolls, means for rotating these rolls and delivering said bands to the laying devices practically free from strain, and also means for shearing each series of bands after being laid upon said table.

The invention also comprises means for guiding the bands to the table, means for holding the ends of these bands in position while they are being rolled down into place, and afterwards sheared, means for holding the bands upon the table in position, and means for holding the ends of the bands from the storage rolls in position in the laying device during and after the shearing of the bands laid on the table.

It also includes means for intermittently moving the table or conveyor a predetermined amount at regular intervals, immediately succeeding the laying of the bands thereon, the table being stationary while the bands are being laid. It also provides driven pressure rolls for taking the fabric from the moving table and compressing it, adjustable slitting means to cut the fabric into desired widths, and a power driven roll to store the finished fabric together with suitable material to keep the layers of fabric from adhering together.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting however, but one of various mechanical forms in which the principle of the invention may be used.

In said annexed drawings:—

In the drawings the present machine is illustrated as having a suitable base or frame work $A^6$ in which is mounted a segmentary movable table or conveyor A composed of segments $A^1$ attached to and movable with a sprocket chain $A^2$ mounted on a sprocket wheel $A^3$ suitably journaled in the frame. The table is adapted to have a regularly recurring intermittent movement which is imparted thereto from a motor B or other source of power driving through reduction gearing $B^1$, $B^2$, $B^3$, $B^4$, $B^5$ and $B^6$ to a crank shaft $B^7$ mounted in the frame and the crank $B^8$ is adapted to drive the sprocket wheel $A^3$ by means of the pawl $B^9$, ratchet wheel $B^{10}$ and gear $B^{11}$ to gear $B^{12}$ mounted on the same shaft carrying the sprocket wheel $A^3$. The travel of the crank $B^8$ is so adjusted as to give one quarter turn to the ratchet wheel $B^{10}$ to each revolution of the crank shaft $B^7$. The relation of the gears $B^{11}$ and $B^{12}$ and the sprocket wheel $A^3$ is such as move the table forward a predetermined distance according to the number of bands of material to each series as will be clearly apparent from the following description.

The table A is endless and the lower portion rests on rails $A^5$ on the main bed $A^6$ of the machine, while an idler sprocket wheel $A^7$ guides the table to its working position on the top of the frame $A^4$.

The bands of material are laid upon the table A as shown in the drawings, by means of carriers D for each series of bands, there being four such carriers shown. In the frame $A^4$ of the machine are attached the frames $D^1$ and $D^2$ having guide tracks $D^3$ in which the carriers D are slidably mounted. To drive these carriers lead screws $D^4$ are provided which have threaded engagement with the carrier frames, and which are suitably journaled in the side main frames $D^1$ and $D^2$. These lead screws are driven from a shaft $D^7$ mounted along the table and provided with bevel gears $D^6$ meshing with bevel gears $D^5$ mounted on the ends of the lead screws. The carriers are moved back and forth across the table, the shaft $D^7$ being rotated first in one direction and then the other by means of a bevel gear $D^9$ meshing with a bevel gear $D^8$ on the end of the shaft. To drive the shaft $D^7$, the crank shaft $B^7$ is provided with two cranks $B^{13}$ and $B^{14}$ set approximately 180° apart and adapted to drive the gear $D^9$ through gears $D^{10}$, $D^{11}$ and $D^{12}$ by means of pawls $D^{13}$ and $D^{14}$ which engage with ratchet wheels $D^{15}$ and $D^{16}$ which are mounted on the same shaft $D^{17}$ that carries gear $D^{12}$. These pawls are adapted to turn this shaft one quarter turn in first one direction and then the other for each revolution of the crank shaft $B^7$. The gear train is so arranged as to move the carriers D from one side to the other of the table for each quarter revolution of the gear $D^{12}$. This movement of the carriers is correlated to that of the table, the carriers being moved from the position shown in Fig. 6 (their shearing position) across the table to their band laying position while the table is being moved and are adapted to move in the reverse direction to lay the bands on the table while the table is at rest.

The carriers D carry the band laying mechanism and are provided with means for laying a plurality of bands at once, the number of bands being equal in each carrier. The bands of each series are of equal width and are spaced apart a distance equal to their width. The bands are fed to the carriers or band laying devices from suitable rolls of spaced bands or they may be fed direct from a band forming device connected to the machine.

The material used for the bands may be any suitable fabric or cord construction but is preferably cord fabric which consists of cords woven as ordinarily prepared for cord tires with a weak woof thread spaced at intervals, the fabric being properly treated with rubber and calendered ready for incorporation into a tire. The spacing device for preparing the bands consists of a base $C^{20}$ having uprights $C^{21}$ in one of which is mounted a spool $C^1$ having the fabric C rolled thereon. Mounted on a bracket or arm $C^{22}$ are rolls $C^4$ and $C^5$ which serve as the splitting means for the bands. The bands are split from the cloth and as the cloth passes between the rolls $C^4$ and $C^5$, the bands are separated into two series, every other band passing under a guide roll $C^{17}$ to the band laying devices and forming one series $C^{23}$. The other series $C^{24}$ of spaced bands pass over the roll $C^5$ back to a power driven roll $C^6$ and around this roll and between it and a compression roll $C^7$, these last two rolls being mounted in the center upright, and thence to a storage roll $C^2$ mounted in the third upright of the frame. This storage roll $C^2$ may of course be substituted for the roll $C^1$ as the bands on the storage roll are equal in number and width to those on the roll $C^1$ and equally spaced.

The center upright carries a driving shaft $C^{10}$ having a bevel gear $C^{11}$ at the top adapted to be driven from any convenient power source, such as the gear $C^{16}$ on shaft $D^7$, and this shaft $C^{10}$ is adapted to drive the roll $C^6$ through the bevel gears $C^8$ and $C^9$. The storage roll $C^2$ is driven through the spiral gears $C^{14}$ and $C^{15}$ and the friction plates $C^{12}$ and $C^{13}$ which allow the drum to wind more slowly as the material is wound thereon and its diameter increases.

The gear $C^{16}$ is so mounted on shaft $D^7$ as to be rotatable thereon in one direction and to rotate therewith in the other direction, being arranged to rotate the rolls $C^6$, $C^2$ and $C^1$ only when the table A is in motion.

The band laying mechanism is mounted on the carrier frame and the machine. The actual laying mechanism consists of a series of spring pressed fingers E which are reciprocably mounted in the carrier D, these fingers having aligned openings which receive a cam bar $E^5$ having a series of cams $E^{20}$ adapted to raise or lower the fingers simultaneously. These fingers are provided with guide rolls $E^1$ and $E^2$, the bands C being fed from the roll $C^1$ over the upper roll $E^1$ and then down under the lower roll $E^2$ from which it is laid on the table.

Figure 1:
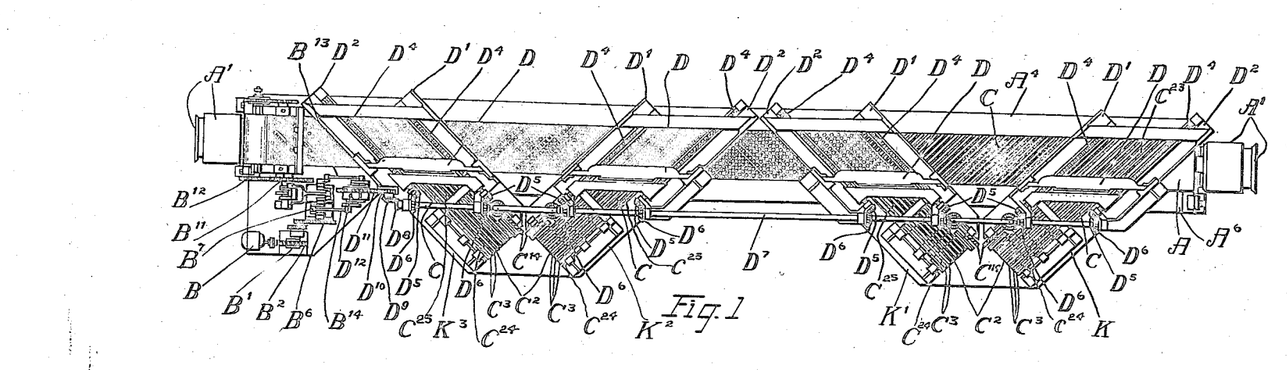
Fig. 1 is a plan view of the machine.
Figure 2:
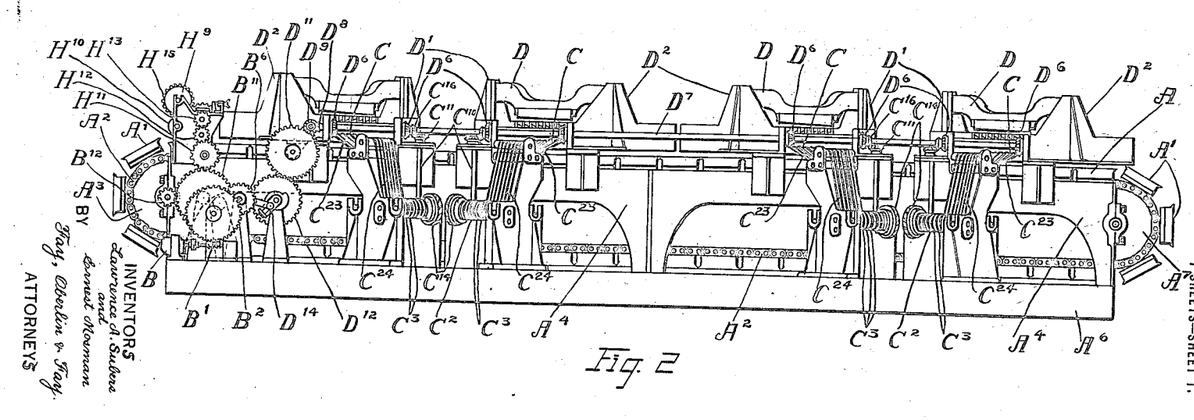
Fig. 2 is a side view of the machine.
Figure 3:
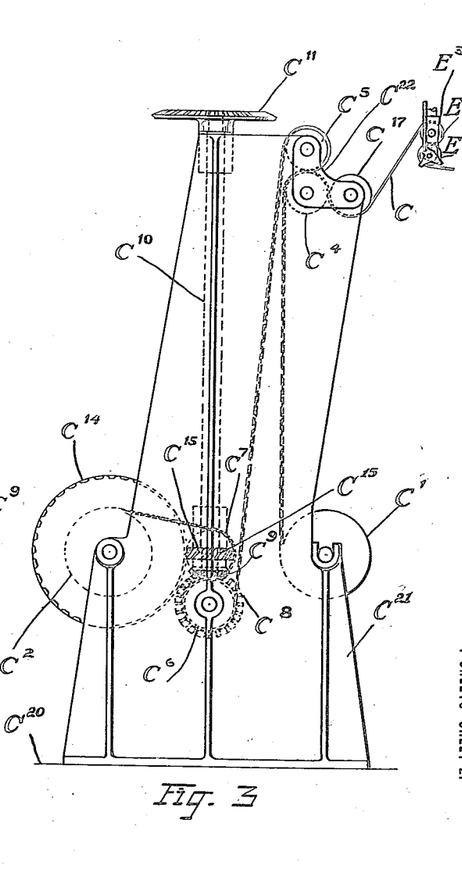
Fig. 3 is an end view of the band roll storage and slitting mechanism.
Figures 4, 5:
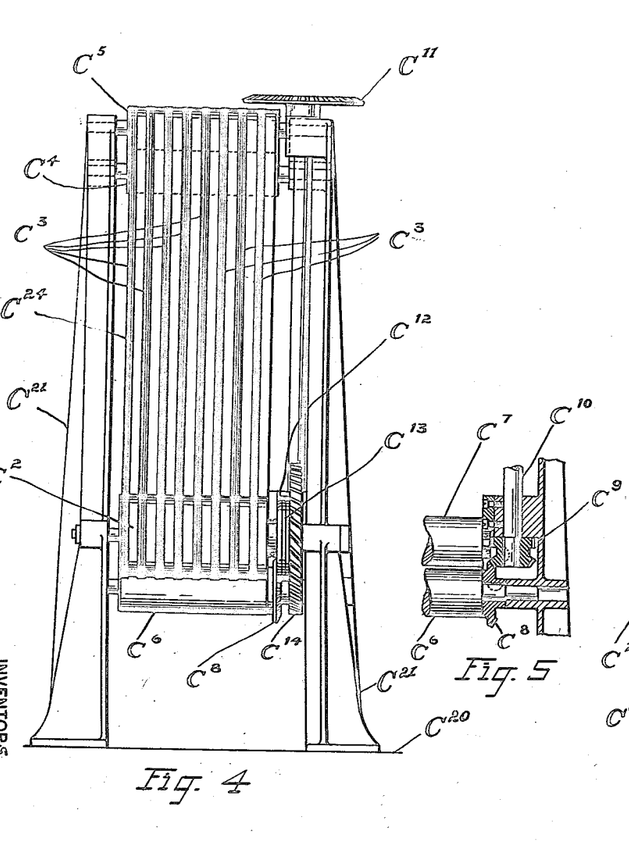
Fig. 4 is a front view of the same.
Fig. 5 shows a partial sectional view of the gear drive for the pulling rolls of the band roll storage and splitting mechanism.
Figures 6, 7, 8, 9, 10, 11:
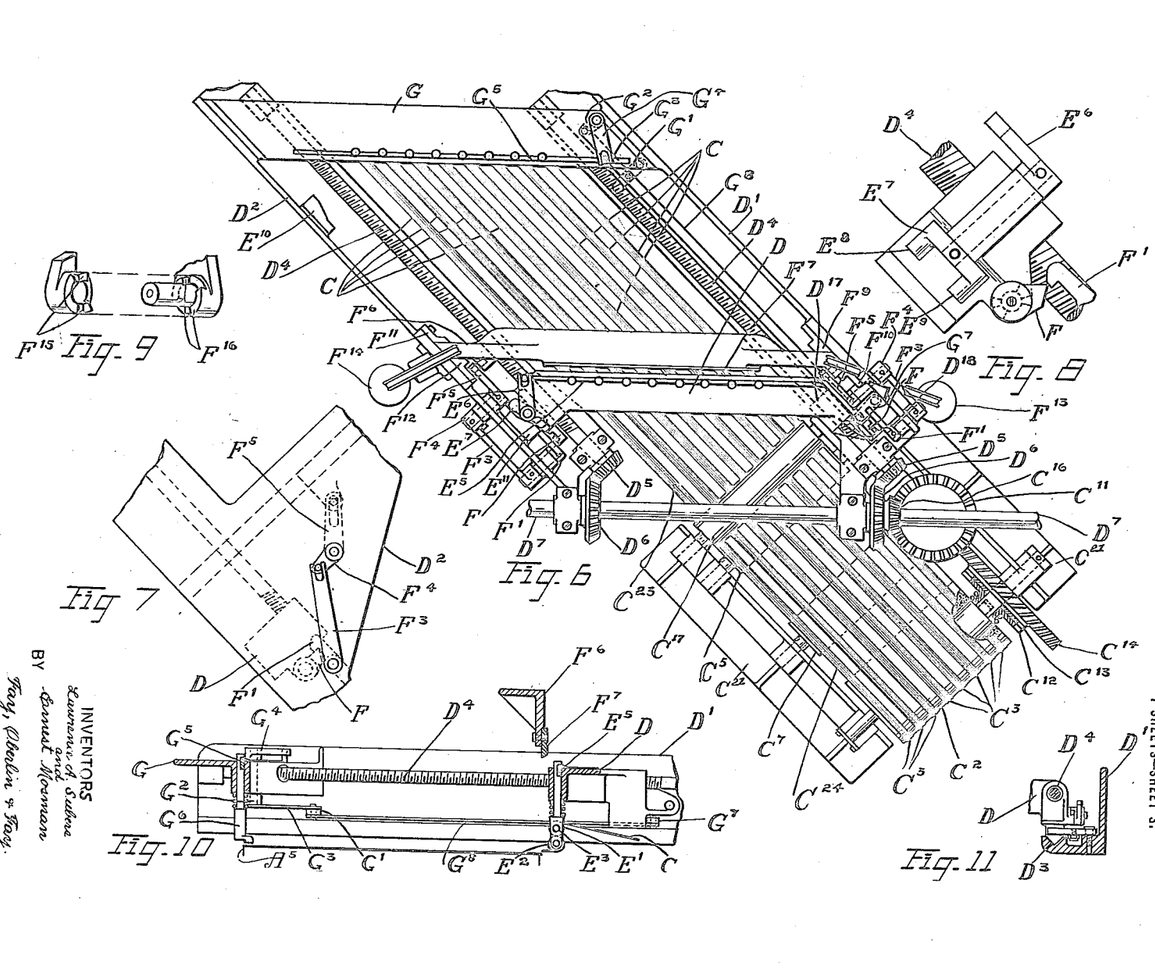
Fig. 6 is a plan view of the band laying mechanism and shearing device.
Fig. 7 is a partial side view of the lever movement for operating the shear.
Fig. 8 is a partial side view of the lever arrangement for raising and lowering the guide rolls in the band laying device.
Fig. 9 shows the tripping lugs in a portion of the shear operating mechanism.
Fig. 10 shows a partial sectional view of the raising and lowering mechanism for the band holding fingers and band guiding and laying rolls.
Fig. 11 is an end view of a portion of the lever device for raising and lowering the band holding fingers.
Figure 12:
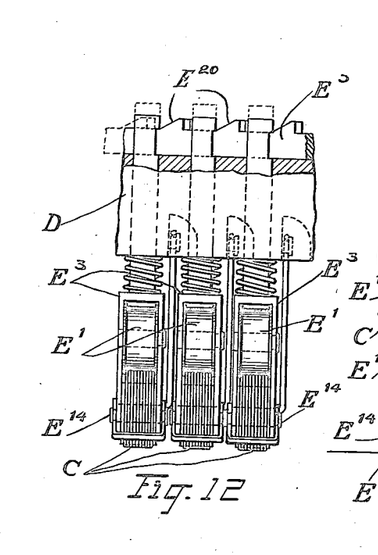
Fig. 12 shows an enlarged front view of a series of the band guiding and laying rolls with the cam for raising and lowering the same.
Figures 13, 14:
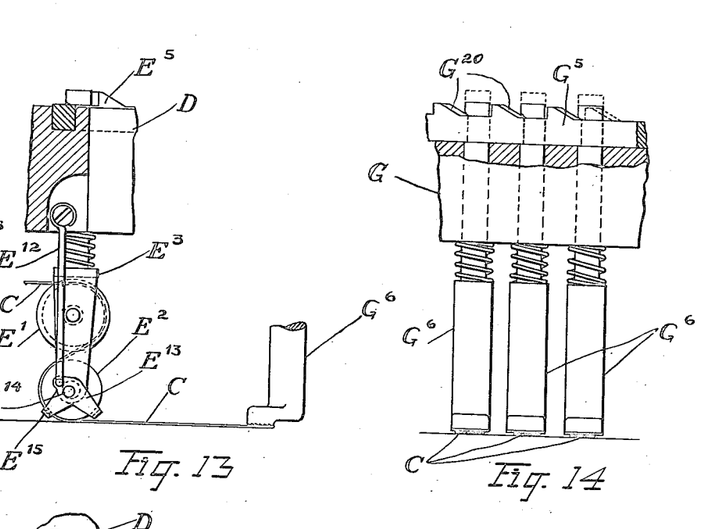
Fig. 13 is a side view of the same showing the band being laid in position with a portion of a band holding finger.
Fig. 14 shows an enlarged front view of a series of the band holding fingers with the cam for raising and lowering the same.
Figure 15:
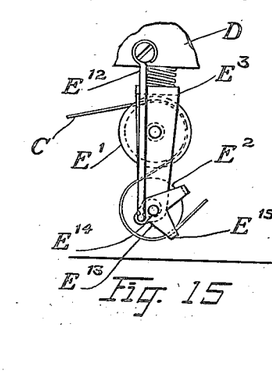
Fig. 15 shows an enlarged side view of the band rolling and guiding rolls in the upper position with the gripping device for holding the band.

The fingers are all in their raised position during movement of the carrier across the table to its laying position and are then lowered as the table stops its movement. In the following movement across the now stationary table, the bands are laid until the carrier reaches its shearing position as shown in Fig. 6. At this point the fingers are raised by means of the cams $E^{20}$. Each finger has near the lower end a catch $E^{13}$ eccentrically mounted on a stud $E^{14}$, the catch having a second lower member $E^{15}$. These catches are operated by a rod $E^{12}$ which is attached to the carrier frame. Downward movement of the finger then moves the catches $E^{13}$ and $E^{15}$ into the laying position as shown in Fig. 13, while the fingers are in their raised position, the catch $E^{15}$ holds the band up as clearly shown in Fig. 15 to allow the band to clear the table during the return movement of the carrier.

This cam bar $E^5$ is operated by levers $E^6$ and $E^7$, the latter having projecting lugs $E^8$ and $E^9$ which are engaged respectively by cams $E^{10}$ and $E^{11}$ as the carrier reaches its laying or shearing position.

Mounted over the table at the side thereof are series of spring pressed holding fingers $G^6$ which are adapted to press down on the ends of the bands to hold them in position during the laying operation. These are raised as the carrier reaches its shearing position, the portion $D^{18}$ of the carrier engaging the lever $G^7$ which operates the lever $G^1$ through the link $G^8$, the lever $G^1$ operating link $G^3$ which in turn actuates the lever $G^2$ rotating the lever G to move the cam bar $G^5$ which acts to raise the fingers $G^6$ before the table starts its movement. The cam bar $G^5$ is provided with cams $G^{20}$ which are similar in construction and operation to the cams $E^{20}$ of the band laying fingers.

Figures 16, 17, 18:
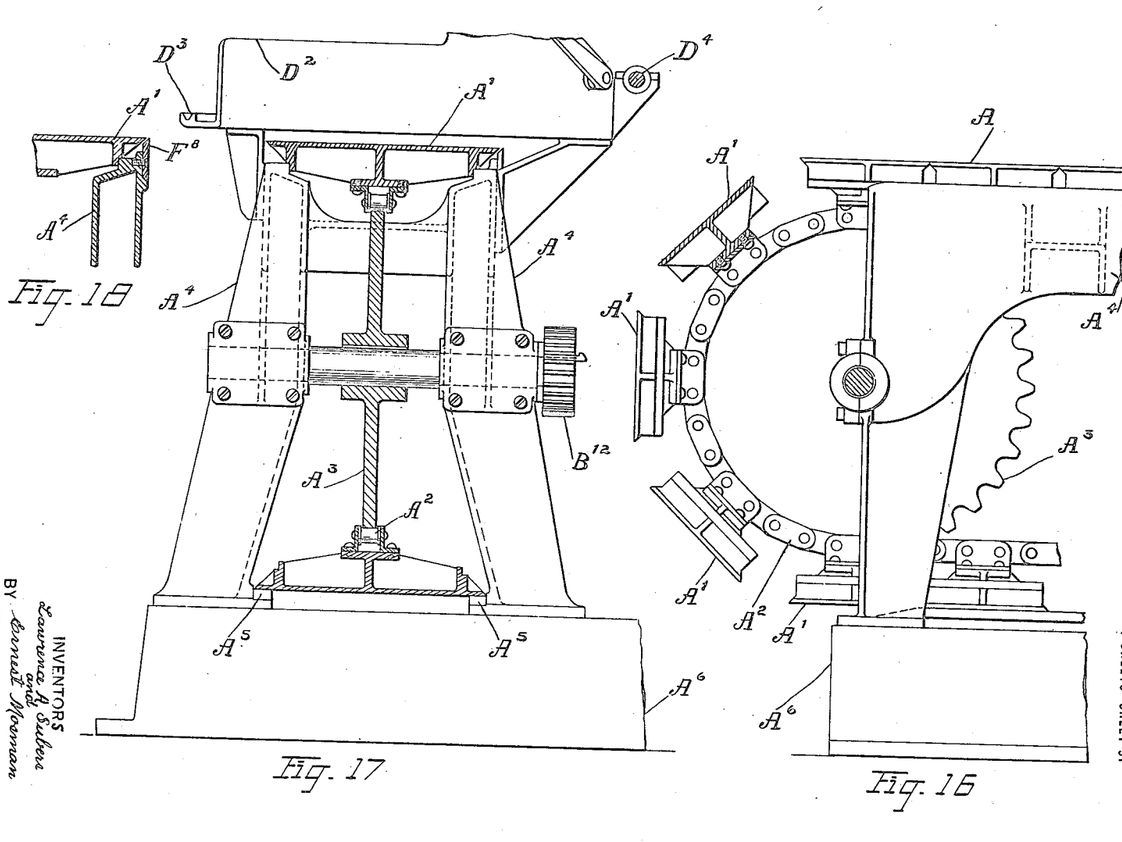
Fig. 16 shows an enlarged side view of a portion of the moving table or conveyor and the propelling sprocket wheel for the same.
Fig. 17 shows an enlarged end view of the supporting frame for the moving table or conveyor with the sprocket wheel and the table segment in section.
Fig. 18 shows a sectional view of a portion of the frame and stationary blade of the shear.
Figure 19:
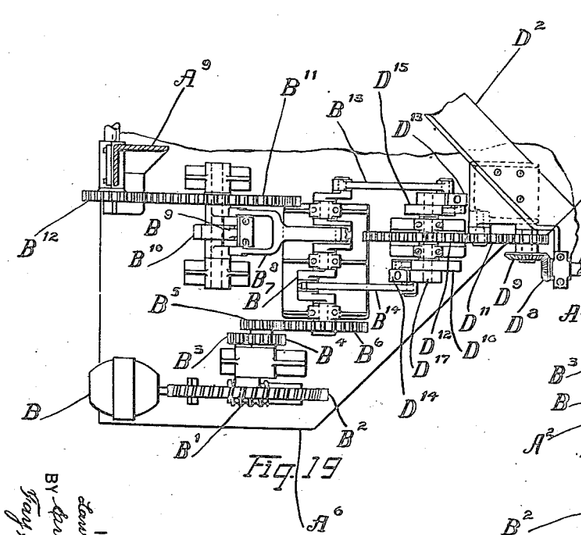
Fig. 19 shows an enlarged plan view of the driving mechanism for operating the machine.
Figure 20:
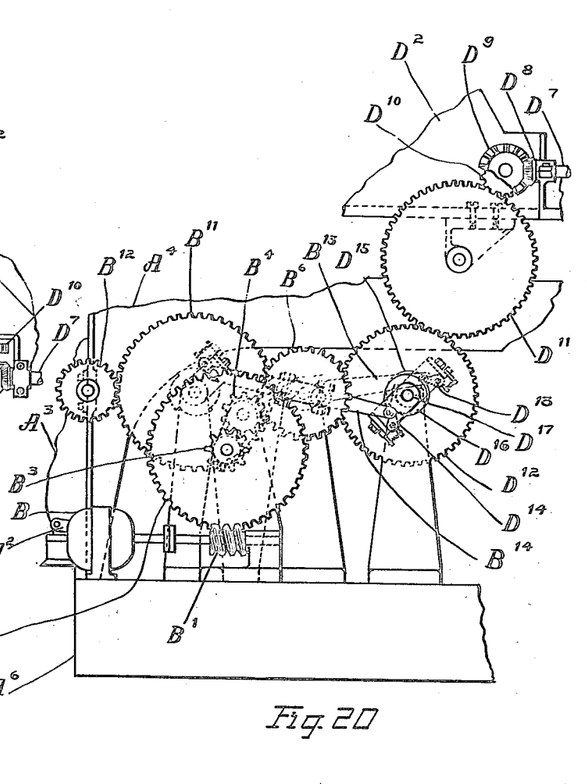
Fig. 20 shows an enlarged side view of the machine driving mechanism.

As the carrier D reaches the shearing position as shown in Fig. 6, a lever F mounted on the carrier D engages a lever $F^1$ mounted on the frames $D^1$ and $D^2$, and lever $F^1$ in turn rotates the lever $F^3$ which engages lever $F^4$ which then rotates lever $F^5$, the latter engaging the shear $F^6$, moving it downward and shearing the bands C by the shear blades $F^7$ and $F^8$. The shear $F^6$ is slidably mounted in the frames $D^1$ and $D^2$, held in position by gibs $F^9$, $F^{10}$, $F^{11}$ and $F^{12}$. The shear blade $F^7$ is attached to the shear $F^6$ while blade $F^8$ is attached to the main frame of the machine $A^4$ as shown in Figs. 17 and 18. The shear $F^6$ is returned to its normal upper position by the counter weights $F^{13}$ and $F^{14}$, the lever $F^1$ dropping over the point of the lever F allowing the movement to take pace as shown in Fig. 7. When the carrier D moves to its laying position, the lever F rotates freely, lever $F^1$ not being moved, while rotation of lever F in the opposite direction is impossible by reason of the lugs $F^{15}$ engaging lugs $F^{16}$ on the frames $D^1$ and $D^2$ as shown in Fig. 9.

As the table A moves, the carrier D moves over across the table to the band laying position, which is at the point where the end of the band C (see Fig. 15) will come over the edge of the table $A^5$. As the carrier arrives at this point, the portion $D^{17}$ thereof engages lever $G^1$ which operates lever $G^2$ through the link $G^3$ rotating lever $G^4$ which in turn moves cam bar $G^5$ which allows the spring pressed holding fingers $G^6$ to descend and secure the ends of the bands C against the table A. The holding fingers $G^6$ are supported in the finger frame G which is secured to the side frames $D^1$ and $D^2$.

At the same time the lug $E^8$ of the lever $E^7$ engages the cam $E^{10}$ and thereby rotates the lever $E^6$ which moves the cam bar $E^5$ allowing the spring pressed fingers $E^3$ to descend, the roller $E^2$ being pressed against the table A. The travel of the carrier D is immediately reversed and bands C are thereby laid on the table A by the rollers $E^2$. In reaching the shearing position the carrier D passes under the shear $F^6$ and the shearing of the bands follows as previously described.

The operation of the band laying units or devices K, $K^1$, $K^2$, and $K^3$ are identical and occur simultaneously, the distance apart of unit K and $K^2$ being such that the bands C laid by unit $K^2$ come exactly over the spaces between the bands laid by unit K, while the unit $K^3$ is spaced at such a distance from unit $K^1$ that the bands laid by unit $K^3$ come exactly over the spaces between the bands laid by unit $K^1$. It is obvious that the units K, $K^1$, $K^2$ and $K^3$ may lay as many bands at once on the table as desired, and that the table A may be of any desired practical width.

The table A is treated as needed with an adhesive substance of such material as not to interfere with the vulcanization of the fabric bands, this adhesion keeping the bands in position on the table A when laid thereon by the carrier D. Other means of holding these bands in position may however be employed if desired. This is required for the bands from unit K only, since the bands from $K^1$ adhere to those of K, those of $K^2$ adhere to those of $K^1$ and those of $K^3$ adhere to those of $K^2$.

Figure 21:
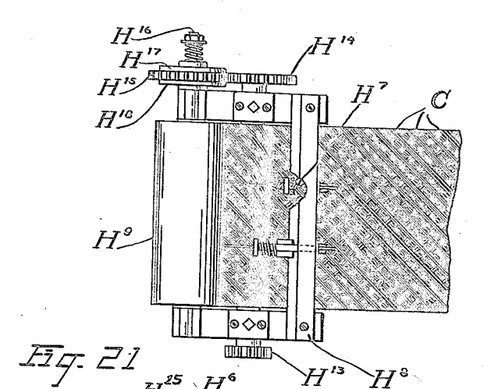
Fig. 21 is a plan view of a portion of the machine showing the finished fabric rolled up and slit lengthwise after being compressed between two pressure rolls.
Figure 22:
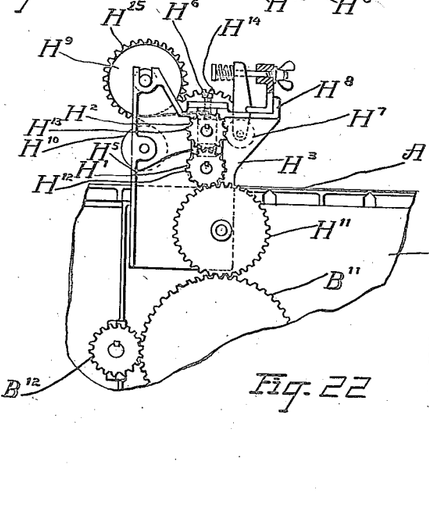
Fig. 22 is a side view of the portion of the machine shown in Fig. 21, showing the train of gears for driving the fabric compressing and storage rolls.
Figure 23:
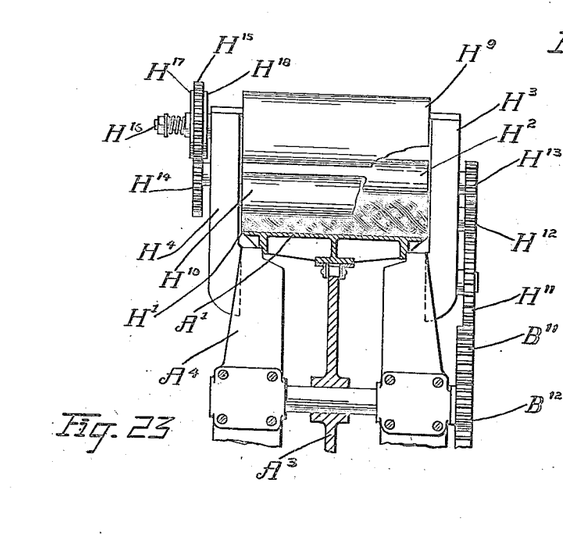
Fig. 23 is an end view of the portion of the machine shown in Fig. 21 and shows the relative positions of the fabric storage rolls and sliding table.

As shown in Figs. 21, 22 and 23 the fabric after being completely formed upon the table is passed between pressure rolls $H^1$, $H^2$ mounted in brackets $H^3$, and $H^4$ attached to the frame $A^4$ of the machine. The roll $H^2$ is mounted in slidable bearings $H^5$, and is pressed against roll $H^1$ by the screw $H^6$.

Slitting cutters $H^7$ adjustably mounted on a bar $H^8$ engaging the fabric on roll $H^2$ slit the fabric lengthwise according to the width desired, while the fabric is stored on the friction driven roll $H^9$ together with Holland cloth or other suitable material from the roll $H^{10}$ to prevent the layers of fabric from adhering together.

The pressure rolls $H^1$ and $H^2$ are driven by the train of gears $H^{11}$, $H^{12}$ and $H^{13}$ from the gear $B^{11}$ while storage roll $H^9$ is driven by the gear $H^{14}$, attached to the shaft of roll $H^2$, engaging gear $H^{15}$ rotatably mounted on the shaft $H^{16}$ of roll $H^2$ and acting through the spring pressed friction plates $H^{17}$ and $H^{18}$ attached to the shaft $H^{16}$.

The pressure rolls $H^1$ and $H^2$ which compress the fabric into a solid sheet preparatory to slitting into desired widths receive their power from the train of gears operating the table and act only when the table moves, the roll diameters and speed being such as to take care of the fabric as it is completed on the table.

The operation of the machine as a whole seems to be clear from the foregoing description, the fabric being formed on the table from four series of equal width bands, the bands of the first series being laid parallel and equally spaced apart a distance equal to the width of the bands, and the bands of the next series being laid similarly but at a reverse angle, the two following series being laid in the same directions respectively as the first and second series but filling the spaces between the bands of these series. Thus the fabric is formed continuously and the bands are finally pressed and rolled together to form the finished fabric before it leaves the machine.

It is obvious that instead of using a segmental sliding table, a special sprocket chain might be attached to a flexible belt or conveyor, properly supported, upon which the fabric bands might be laid to construct the fabric as shown, without departing from the spirit of the invention or the scope of the claims.

It is obvious that a flat intermittently moving table or conveyor may, during alternate periods of rest from longitudinal movement, move sideways in an opposite diagonal direction in the second period of rest by employing suitable operating mechanism therefor, while the devices for laying the bands may be stationary and not move across the table without departing from the spirit of the invention or the scope of the claims.

It is evident that a varied thickness of fabric may be constructed by increasing the series of band laying devices in multiples of four, retaining the other features of the machine practically unchanged without departing from the spirit of the invention or the scope of the claims.

It is also evident that a modified form of machine may be constructed in which a continuously moving table may be used, while the relative speed of the band laying devices may be such as to lay the bands at the angle desired, without departing from the spirit of the invention or the scope of the claims.

It is evident that suitable means may be employed to lay equally spaced bands of material already cut to length upon the table of the machine, to form a laminated cohesive interlaid fabric, without departing from the spirit of the invention or the scope of the claims.

It is also evident that one band laying device, suitably arranged to lay the series of bands alternately upon the table at different angles, may be employed in place of a series of band laying devices as shown, without departing from the spirit of the invention or the scope of the claims.

Other modes of applying the principle of my invention may be employed instead of the one explained, change being made as regards the mechanism herein disclosed, provided the means stated by any of the following claims or the equivalent of such stated means be employed.

We therefore particularly point out and distinctly claim as our invention:—

1. In a machine for constructing a laminated cohesive interlaid fabric, the combination of a table, a plurality of band laying devices adapted to interlay bands upon said table in predetermined angular spaced relation, and means for compressing the interlaid bands to form the fabric.

2. In a machine for constructing a laminated cohesive interlaid fabric, the combination of a frame, a table mounted therein, a plurality of band laying devices adapted to interlay bands upon said table in predetermined angular spaced relation, and means for removing said interlaid bands from the table and for compressing them to form the finished fabric.

3. In a machine for constructing a laminated cohesive interlaid fabric, the combination of a frame, a table movably mounted in said frame, a plurality of band laying devices mounted over said table, and adapted to interlay series of spaced bands thereon to form a fabric, means for compressing said bands to form the finished fabric and other means adapted to remove the fabric from said table.

4. In a machine for constructing a laminated cohesive interlaid fabric, the combination of a frame, a table movably mounted in said frame, a plurality of band laying devices mounted on said frame over said table, and adapted to interlay series of spaced bands thereon to form a fabric, means for compressing said bands to form the finished fabric, means adapted to remove the fabric from said table, and other means carried by said frame and adapted to split the fabric during its removal from said table.

5. In a machine for constructing a laminated cohesive interlaid fabric, the combination of a machine base and frame provided with power driving means, a movable table mounted in said frame and adapted to be moved intermittently by said driving means, a plurality of band laying devices mounted on said frame over said table, each device being adapted to lay a series of bands on said table in a predetermined angular spaced relation, the bands being interlaid by the several devices, means for operating said band laying devices between movements of said table, and means for removing said interlaid bands from said table.

6. In a machine for constructing a laminated cohesive interlaid fabric, the combination of a machine base and frame provided with power driving means, a movable table mounted in said frame and adapted to be moved intermittently by said driving means, a plurality of band laying devices mounted on said frame over said table, each device being adapted to lay a series of bands on said table in a predetermined angular spaced relation, the bands being interlaid by the several devices, means for operating said band laying devices between movements of said table, means for removing said interlaid bands from said table, and means for compressing them during removal to form the finished fabric.

7. In a machine for constructing a laminated cohesive interlaid fabric, the combination of a machine base and frame provided with power driving means, a movable table mounted in said frame and adapted to be moved intermittently by said driving means, a plurality of band laying devices mounted on said frame over said table, each device being adapted to lay a series of bands on said table in a predetermined angular spaced relation, the bands being interlaid by the several devices, means for operating said band laying devices between movements of said table, means for removing said interlaid bands from said table, means for compressing said interlaid bands into the finished fabric during removal, and means for storing such finished fabric.

8. In a machine for constructing a laminated cohesive interlaid fabric, the combination of a machine base and frame provided with power driving means, a movable table mounted in said frame and adapted to be moved intermittently by said driving means, a plurality of band laying devices mounted on said frame over said table, each device being adapted to lay a series of bands on said table in a predetermined angular spaced relation, the bands being interlaid by the several devices, means for operating said band laying devices between movements of said table, means for removing said interlaid bands from said table, means for compressing said interlaid bands into the finished fabric during removal, means for storing such finished fabric, and means for slitting such fabric during its removal and compression prior to storing the same.

9. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and means for compressing said bands to form the finished fabric.

10. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and compression rolls mounted in said frame adjacent one end of said table and adapted to receive and compress the interlaid bands during movement of said table to form the finished fabric.

11. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and compression rolls mounted in said frame adjacent one end of said table and adapted to receive and compress the interlaid bands during movement of said table to form the finished fabric, and storage means carried by said frame and adapted to receive the finished fabric from said compression rolls.

12. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table and compression rolls mounted in said frame adjacent one end of said table and adapted to receive and compress the interlaid bands during movement of said table to form the finished fabric, storage means carried by said frame and adapted to receive the finished fabric from said compression rolls, and slitting means mounted adjacent said compression rolls, and adapted to slit the fabric sheet into desired width prior to said storage means.

13. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and compression rolls mounted in said frame adjacent one end of said table and adapted to receive and compress the interlaid bands during movement of said table to form the finished fabric, and a storage roll carried by said frame and adapted to be rotated from said driving means to receive such fabric from said compression rolls and to wind up the same.

14. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and compression rolls mounted in said frame adjacent one end of said table and adapted to receive and compress the interlaid bands during movement of said table to form the finished fabric, and adjustable slitting cutters mounted on said frame and adjacent said compression rolls and adapted to slit the fabric into strips of predetermined width prior to passing into said compression rolls.

15. In a machine for continuously constructing a laminated cohesive interlaid fabric, the combination of a base and frame provided with power driving means, an endless segmental table movably mounted in said frame and adapted to be moved intermittently from said driving means, a plurality of band laying devices mounted on said frame over said table and being adapted to be operatively connected to said driving means, said band laying devices being adapted to interlay similar series of bands at predetermined angles and spacing between movements of said table, and compression rolls mounted in said frame adjacent one end of said table and adapted to receive and compress the interlaid bands during movement of said table to form the finished fabric, and a storage roll carried by said frame and operated from said driving means and adapted to receive from said compression rolls and wind up such split strips of fabric.

Signed by us, this 14th day of October, 1920.

LAWRENCE A. SUBERS.
ERNEST MOSMAN.